Dec. 7, 1954   W. S. EATON   2,696,154
DEFLECTING MEANS FOR VEHICLES
Filed July 17, 1948   3 Sheets-Sheet 1
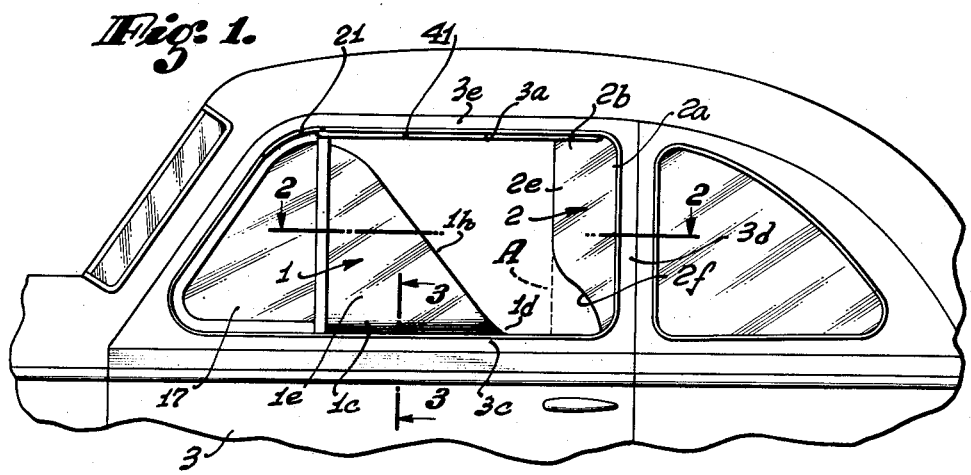
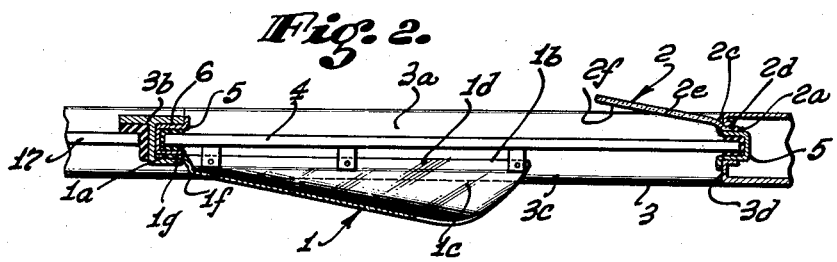
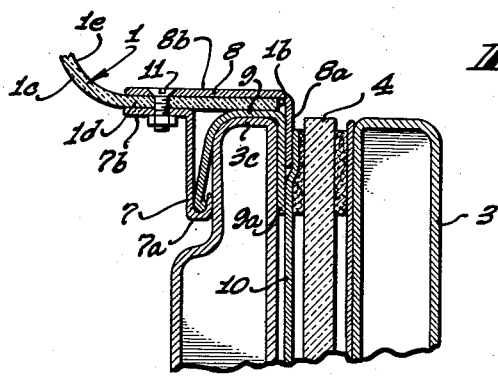
WARREN S. EATON,
INVENTOR.
BY *William C. Hall*
ATTORNEY.

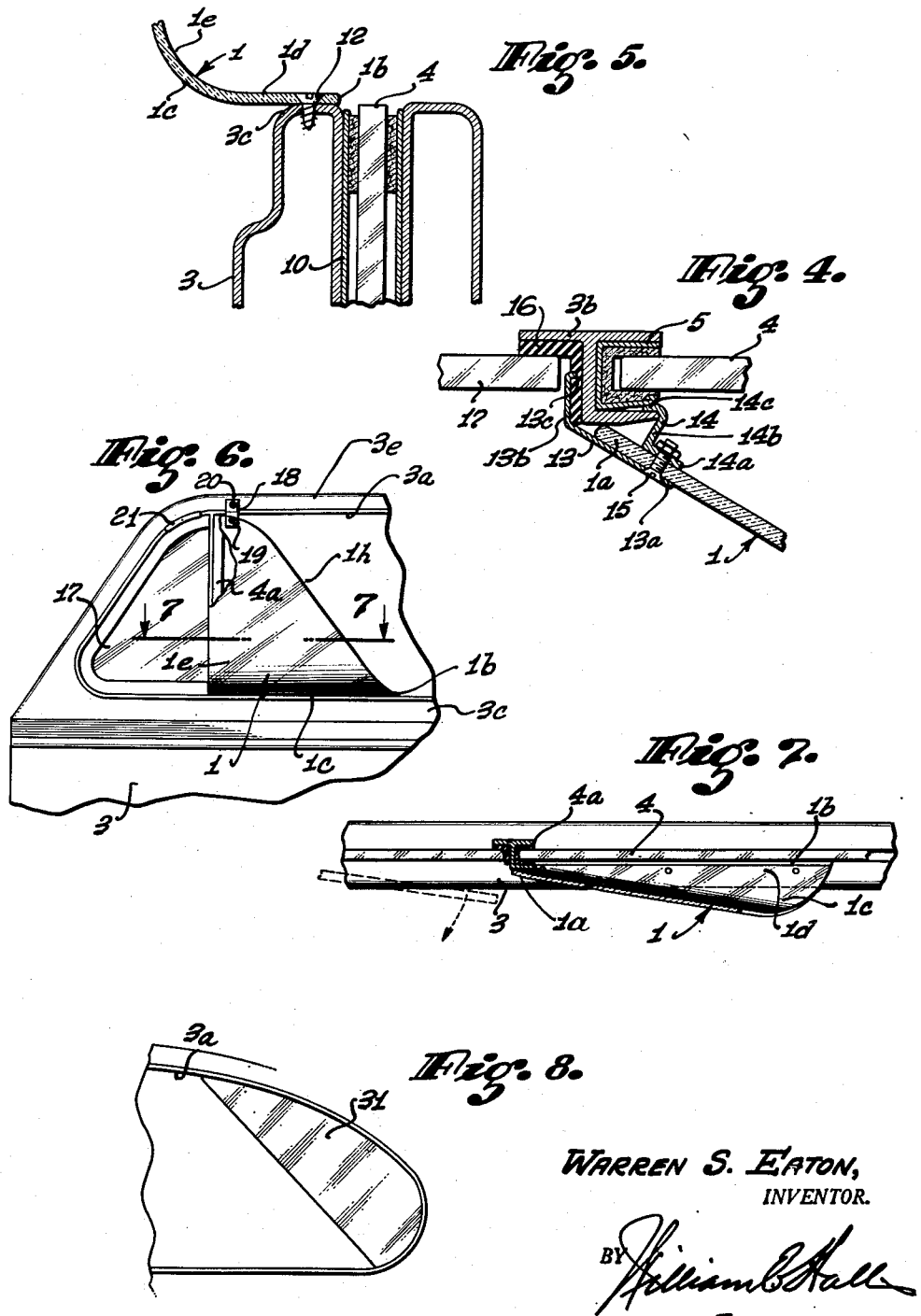

Dec. 7, 1954  W. S. EATON  2,696,154
DEFLECTING MEANS FOR VEHICLES
Filed July 17, 1948  3 Sheets-Sheet 3
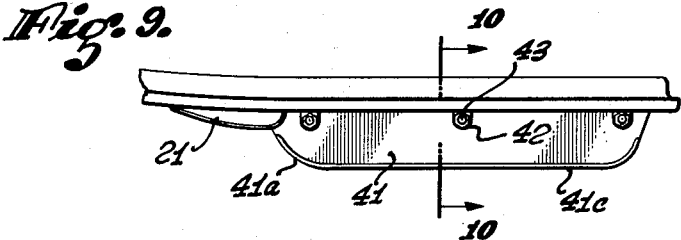
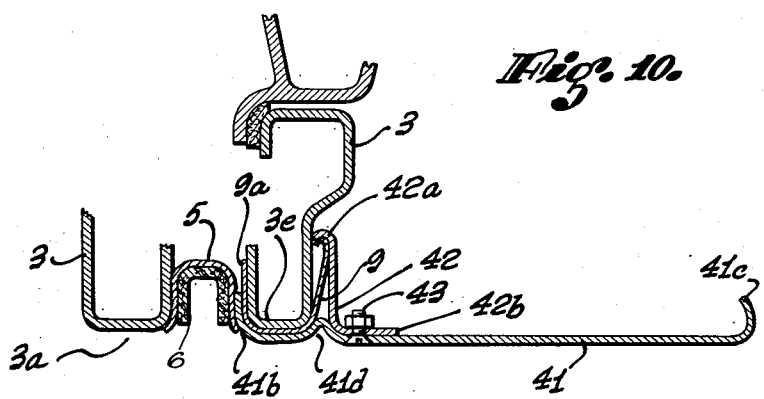
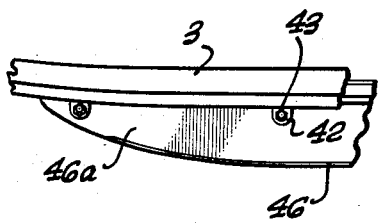
Warren S. Eaton,
INVENTOR
BY
ATTORNEY

United States Patent Office 2,696,154
Patented Dec. 7, 1954

2,696,154

DEFLECTING MEANS FOR VEHICLES

Warren S. Eaton, Los Angeles, Calif.

Application July 17, 1948, Serial No. 39,328

9 Claims. (Cl. 98—2)

My invention relates to deflecting means for vehicles, and particularly for deflecting air or wind and shielding sun from, and generally for protecting the arm of the driver of the vehicle.

One of the principal objects of this invention is to provide means of this class which is simple and economical of construction and durable, and which may be easily applied to or installed on various types of vehicles.

Another important object of this invention is to provide means of this class which, when installed in window frames or doors of a vehicle, will not interfere with the normal opening or closing operation of the window pane, or normal operation of the door upon which it may be mounted.

An important object also of this invention is to provide means of this class which will effectively deflect air and shield the sun's rays from the driver's arm which may rest on the sill of the door or window opening, which will effectively divert air from the interior of the body of the vehicle so as to eliminate drafts therein, which will deflect bugs, road splash, and the like, from the interior of the body of the vehicle, which will reduce glare and still provide not only ample opening for the extension of the signalling arm as often as required by traffic laws, but also a convenient arrangement of parts whereby the arm may be readily swung outwardly for signalling purposes or withdrawn.

A further important object of this invention is to provide a simple hood or canopy, and simple and economical means of securing the same to the door or other wall member, above a window opening therein, particularly for protection against rain and sun, and one causing no substantial head resistance.

With these and other objects in view, as will appear hereinafter, I have devised a deflecting means having certain novel features of construction, combination, and arrangement of parts and portions, as will be hereinafter described in detail, and particularly set forth in the appended claims, reference being had to the accompanying drawings and to the characters of reference thereon, which form a part of this application, in which:

Fig. 1 is a fragmentary side elevational view of an automobile embodying my invention in a preferred form of the aforementioned deflecting means on a door of the automobile;

Fig. 2 is a transverse sectional view thereof in plan, taken through the line 2—2 of Fig. 1;

Fig. 3 is a fragmentary sectional view, taken on the line 3—3 of Fig. 1, showing means of securing one portion of the deflecting means to the sill of the window opening of the door;

Fig. 4 is an enlarged sectional view showing a modified form of securing the forward portion of the deflector member to the forward rail forming the door opening;

Fig. 5 is a view similar to that of Fig. 3, but showing a slightly modified form of the securing means;

Fig. 6 is a fragmentary side elevational view of a slightly modified form of mounting the forward deflecting member of my deflecting means on a different type of automobile construction;

Fig. 7 is a sectional view in plan, taken through 7—7 of Fig. 6;

Fig. 8 is a fragmentary view of a modified form of the rear shield of the window or door opening;

Fig. 9 is a fragmentary plan view of the side portion of an automobile, showing the contour of the hood arranged over the window opening, as shown in Fig. 1;

Fig. 10 is an enlarged sectional view thereof, taken through 10—10 of Fig. 9, showing a means of fastening the hood; and, Fig. 11 is a fragmentary plan view, similar to Fig. 9, showing a slightly modified form of the hood.

My deflecting means, as shown in the drawings, comprises a deflector or deflecting member 1 and a shield member 2. Both of these members may be employed when the openings in doors or windows are relatively wide.

The deflecting member 1 and the shield member 2 are designed for the conventional automobile door 3 immediately opposite or at the outside of the driver's compartment of the automobile, and designed particularly to be installed in the window opening $3^a$ of the door. As shown, the front and bottom edge portions $1^a$ and $1^b$ of the deflecting member are positioned, respectively, against the forward rail $3^b$ and bottom edge or sill $3^c$, forming the window opening $3^a$; and the rear and top edge portions $2^a$ and $2^b$ of the shield member 2 are positioned, respectively, against the rear and top rails $3^d$ and $3^e$ forming the window opening $3^a$.

The deflector member is preferably moulded from transparent material, or it may be formed or pressed from sheet material of this nature. This material may be flexible, and yieldable to wind pressure or other forces.

Assuming the front and bottom edges as lying substantially in a vertical plane, the upright portion $1^e$ of the deflecting member 1 extends or diverges outwardly from the front edge with respect to said plane, or the wall or door of the vehicle body. The lower part of the upright portion $1^e$ merges in curved form with a horizontal ledge $1^d$ which terminates at its inner edge at said vertical plane. The curved form $1^c$ assumes approximately the shape of a portion of a cone surface, the apex of which lies in the front edge of the member, and the upright portion $1^e$ and ledge $1^d$ are tangent to the curved surface $1^c$. In shape the ledge is substantially triangular, and the longer edges thereof diverge backwardly from the front edge of the member.

The front edge portion of the deflector member 1 is secured to the rail $3^b$ by providing an inward offset $1^f$ and a flange or tongue $1^g$ substantially coplanar with the above mentioned vertical plane and with the window 4 of the door.

In conventional automobile construction, the window 4 is slidably mounted within a channel member 5 which is lined with yieldable material such as felt 6.

The flange $1^g$ is located between the rail $3^b$ and the outer flange of the channel 5, the latter being separated slightly from the rail $3^b$.

The ledge $1^d$ of the deflector 1 is supported at the bottom edge or sill $3^c$ of the window opening of the door. In a preferred form, it is secured in such position by means of a pair of clamp members 7 and 8. The clamp member 7 has a flange $7^a$ which is positioned behind a trim or ornamental strip 9 often placed at the outside of the door 3. The clamp member 7 extends upwardly around the outer side of the trim element and terminates in a flange $7^b$ at the outside of the ledge. An inner flange $8^a$ of the clamp member 8 extends into the opening of the sill through which the window 4 moves. Specifically the flange $8^a$ is positioned between the inner flange $9^a$ of the strip 9 and a member 10 corresponding with the outer flange of the channel 5 through which the window slides. The upper flange $8^b$ of the clamp member 8 is positioned over the upper side of the ledge. A screw 11 secures together both clamp members, as shown in Fig. 3.

In the modified form, shown in Fig. 5, the ornamental trim member 9 is omitted. In such instance, the ledge $1^d$ may be secured, by a screw 12, directly to the outer portion of the sill of the window opening of the door.

The forward edge of the deflecting member 1 may be secured to the vertical forward rail $3^b$ in a manner similar to the securing of the ledge $1^d$ to the sill $3^c$ of the door. Such securing is shown on an enlarged scale in Fig. 4, the securing means consisting of a pair of clamp members 13 and 14, the outer flanges $13^a$ and $14^a$ of which are clamped against the opposite sides of the deflecting member 1 by a screw 15. The forward flange $13^b$ of the clamp member 13 has a hook portion $13^c$, which is embedded in a rubber lining 16 at the forward side of the vertical rail 3b, conventionally employed for seating the conventional wind deflector 17. The clamp member 14 has an offset portion 14b which is provided at its inner end with a tongue 14c which is forced between the outer flange of the vertical rail 3b and the outer flange of the channel 5, as shown best in Fig. 4.

In the modified structure of Figs. 6 and 7, I have shown a conventional type of automobile door construction in which the conventional vertical rail, referred to above as 3b, is omitted. In this case, the window 4 of the door is lined or reinforced with a U-shaped shoe 4a. The rear edge of the wind wing or wind deflector 17 is positioned immediately adjacent or in front of the forward edge of the window 4, as shown in Fig. 7. In the event of such construction, the forward edge of the deflecting member 1 terminates substantially flush with the forward edge of the window so as to permit the rear portion of the conventional wind wing 17 to be shifted outwardly. In such construction the forward edge of the deflecting member 1 is merely secured at its lower and upper ends to the sill of the door and the upper rail 3e which forms the upper portion of the window opening of the door. The latter securing is effected by a bracket or clip 18, the lower end of which is secured to the deflecting member by a screw or bolt 19 and the upper end thereof is secured to the upper rail 3e by means of a screw 20.

The shield member 2 may be secured in position in a manner similar to the securing of the front edge portion of the deflector member 1, as shown in Figs. 1 and 2. This shield member has, at its rear and top edges, offset portions 2c terminating at the ends with the flanges or tongues 2d which are forced between the inner portion of the rear rail 3d of the door and the inner flange of the channel 5, in which the window 4 is mounted and slides. The principal portion of the shield member 2, designated 2e, extends forwardly parallel to the plane of the window, or it may diverge slightly forwardly from the rear rail. It is located and intended to deflect air, which may pass beyond the deflector 1, to the outside of the body of the vehicle.

The upper end of the deflector member 1, in some instances, may be located some distance below the upper end of the window opening because of the provision in many vehicles of a rain shield 21, which is provided immediately above the upper end of the forward rail 3b.

As shown in Fig. 1, the upper edge of the deflector 1 is inclined downwardly from the upper apex portion of the deflector located near the front edge, as indicated by 1h. This shape I have found to be sufficient and the most effective to deflect all or most of the air from entering the interior of the vehicle, except when desiring additionally to employ a rear shield 2 in abnormally wide side window openings.

Such inclined upper edge 1h of the deflector member 1 permits the driver's arm, resting on the ledge 1d, to be swung easily upwardly and over the inclined edge 1h in order to signal, and also permits, with equal facility, the return of the arm to such rest position on the supporting ledge.

As shown also in Fig. 1, the lower portion of the shield 2 is cut back, if required, as indicated by 2f, so as to enlarge the opening for the signalling arm of the driver.

As indicated above, only the deflecting member 1 is employed in narrow window openings. In very wide window openings both the deflecting member 1 and the shield 2 may be used. In such wide window openings, the shield 2 may have a straight front edge, as indicated by dotted lines, designated A, in Fig. 1. In intermediate width window openings, a shield 2 with the cut-back portion 2f at the lower end may be employed, as also shown in Fig. 1.

The deflecting member 1 may be constructed of sufficiently yieldable material so that it will yield slightly to air pressure created during travel of the vehicle passing through the air, and will effectively resist, to a considerable degree, such pressure from the outside and cavitation.

In the modified structure, shown in Fig. 8, the rear rail of the window opening is inclined backwardly from the upper to the lower end. In such instance, the shield, designated here as 31, assumes a slightly different shape, requiring no cutout portion at the lower end.

It will be here noted that the deflector member may be constructed of transparent, light filtering material to prevent glare from the sun's rays and to filter out rays which cause sunburn, this being most economically effected by coloring the material of which the deflector member is made.

Fig. 9 shows a hood or canopy 41 arranged over the window opening, which in this instance is the opening 3a of the door 3. The hood or canopy may and is preferably made of sheet metal, and preferably extends laterally in a substantially horizontal plane, from the upper edge of the window opening, as shown in greater detail in Fig. 10. Longitudinally the hood or canopy may extend over the whole width of the window opening, and the forward end thereof, designated 41a, may extend under the rear portion of the rain shield 21, as shown best in Fig. 9.

As shown, the hood may be reinforced longitudinally by the provision of an upwardly turned flange 41b at its inner edge and an upwardly and inwardly turned flange 41c at its outer edge, the latter flange also, of course, providing a trim edge. Adjacent the inner edge of the hood may be provided a slight offset 41d so as to provide a channel for rain to pass backwardly more freely.

The inner edge of this hood may be secured to the frame of the door in a manner similar to that employed in securing the deflector member 1, as shown in Fig. 3. In this instance, however, the inner upwardly turned flange 41b is inserted between the outer portion of the upper rail 3e of the door and the outer flange of the channel 5, referred to above. The inner portion of the hood is secured in this position by a clamp member 42 having a hook portion 42a which extends over and behind the trim or ornamental strip 9, as shown and described in connection with the securing of the deflector member in Fig. 3. A flange 42b at the lower end of the clamp member is clamped to the upper side of the hood 41 by a screw 43. Two or three of such clamp members may be provided, as indicated in Fig. 9. Thus, the hood is secured in position.

Fig. 11 shows a slight modification of the structure shown in Fig. 9, in that the forward end of the hood, designated here as 46, is extended and provides a rain shield portion 46a in the event that the above shown and described rain shield 21 is omitted.

It will be here noted that the deflector member 1, as shown in Figs. 1 and 6, has a downwardly and backwardly inclined upper edge 1h. This construction would permit the sun's rays and rain to enter from above. My hood, shown in Figs. 1, 9, 10, and 11, is designed to prevent this.

I wish it to be understood that I do not desire to be limited to the exact details of construction shown and described, for obvious modifications will occur to a person skilled in the art.

I claim:

1. In a means of the class described, the combination with a vehicle side wall member having an opening, an air deflector comprising a sheet of transparent material shaped to provide substantially front and bottom edges, and means for securing said front and bottom edges to the wall member at the front and bottom portions of the opening therein, said deflector extending outwardly, as a lateral extension with respect to the wall, from said bottom edge of the deflector and in divergent form from the front edge of the deflector, the outer portion of the lateral extension merging in gradual curves with said front edge of the deflector, the upper edge of the deflector being inclined downwardly and backwardly from approximately the top of the front edge of the deflector toward the rear end of the lateral extension of the deflector.

2. In a means of the class described, the combination with a vehicle side wall member having an opening, an air deflector comprising a sheet of transparent material shaped to provide substantially front and bottom edges, means for securing said front and bottom edges to the wall member at the front and bottom portions of the opening therein, said deflector extending outwardly, as a lateral extension with respect to the wall, from said bottom edge of the deflector and in divergent form from the front edge of the deflector, the outer portion of the lateral extension merging in gradual curves with said front edge of the deflector, a shield at the rear portion of the wall opening, the shield extending forwardly of the rear edge of the opening, and means securing the rear edge and one of the adjacent ends to the corresponding rear and adjacent side portions of the wall opening, the upper edge of the deflector being inclined downwardly and backwardly from the front edge of the deflector toward the rear end of the lateral extension of the deflector.

3. In a means of the class described, the combination with a vehicle side wall member having an opening, an air deflector comprising a sheet of transparent material shaped to provide substantially front and bottom edges, means for securing said front and bottom edges to the wall member at the front and bottom portions of the opening therein, said deflector extending outwardly, as a lateral extension with respect to the wall, from said bottom edge of the deflector and in divergent form from the front edge of the deflector, the outer portion of the lateral extension merging in gradual curves with said front edge of the deflector, a shield at the rear portion of the wall opening, the shield extending forwardly of the rear edge of the opening, and means securing the rear edge and one of the adjacent ends to the corresponding rear and adjacent side portions of the wall opening, the lower edge of the shield being downwardly and backwardly inclined to provide a signal-arm receiving space.

4. In a means of the class described, the combination with a vehicle side wall member having an opening, an air deflector comprising a sheet of transparent material shaped to provide substantially front and bottom edges, means for securing said front and bottom edges to the wall member at the front and bottom portions of the opening therein, said deflector extending outwardly, as a lateral extension with respect to the wall, from said bottom edge of the deflector and in divergent form from the front edge of the deflector, the outer portion of the lateral extension merging in gradual curves with said front edge of the deflector, a shield at the rear portion of the wall opening, the shield extending forwardly of the rear edge of the opening, and means securing the rear edge and one of the adjacent ends to the corresponding rear and adjacent side portions of the wall opening, the upper edge of the deflector being inclined downwardly and backwardly from the front edge of the deflector toward the rear end of the lateral extension of the deflector, the lower edge of the shield being downwardly and backwardly inclined to provide a signal-arm receiving space.

5. In a means of the class described, the combination with a vehicle side wall member having an opening, an air deflector comprising a sheet of transparent material shaped to provide substantially front and bottom edges, means for securing the same to the wall member at the wall opening, said deflector extending outwardly, as a lateral extension with respect to the wall, from said bottom edge of the deflector and in divergent form from the front edge of the deflector, the outer portion of the lateral extension merging in gradual curves with said front edge of the deflector forming a shield outwardly from the outer face of the wall and over a portion of the opening, the upper edge of the deflector being inclined downwardly and backwardly from the front edge of the deflector toward the rear end of the lateral extension of the deflector, and a hood extending laterally from the wall member above the opening and to the forward end of the opening, said hood extending substantially above the opening provided above the upper edge of the deflector.

6. In a means of the class described, the combination with a vehicle side wall member having an opening, an air deflector comprising a molded plate of transparent material shaped to provide substantially front and bottom edges, means for fixedly securing said front and bottom edges to the wall member at the front and bottom portions of the opening therein, said deflector extending outwardly, as a lateral extension with respect to the wall, from said bottom edge of the deflector and in divergent form from the front edge of the deflector, the outer portion of the lateral extension merging in gradual curves with said front edge of the deflector, a shield at the rear portion of the wall opening, the shield extending forwardly of the rear edge of the opening, and means fixedly securing the rear edge and one of the adjacent ends of the shield to the corresponding rear and adjacent side portions of the wall opening, the rear edge portion of the air deflector being positioned outwardly and the forward edge portion of the shield being spaced rearwardly from the rear edge portion of the deflector so as to provide a space between the deflector and the shield longitudinally with respect to the automobile, through which a signalling arm may be extended.

7. A means of the class described for use in connection with a vehicle side wall member having an opening, an air deflector of transparent material shaped to provide substantially straight vertical front and horizontal bottom edges, means for securing said front and bottom edges to the wall member at the front and bottom portions of the opening therein, said deflector extending outwardly, as a lateral extension with respect to the wall member, from said bottom edge of the deflector and in divergent form from the front edge of the deflector, the outer portion of the lateral extension merging in gradual curves with said front edge of the deflector, a shield at the rear portion of the wall opening and extending forwardly of the rear edge of the opening, means for securing the rear edge and one of the adjacent side portions of said shield to the wall opening, the rear edge portion of the air deflector being positioned outwardly and the forward edge portion of the shield being deflected inwardly, each being substantially parallel to the plane of the opening, the rear edge of the deflector and the forward edge of the shield being spaced to provide for the lateral extension of a signalling arm, and a hood secured to the wall member along the upper edge portion of its said opening, said hood projecting laterally from the wall member and overlying the said wall opening.

8. A means of the class described for use in connection with a vehicle side wall member having an opening, an air deflector of transparent, yieldable and flexible material formed to provide substantially vertical front and horizontal bottom edges, and means for securing said front and bottom edges to the wall member at the front and lower portions of the opening therein, said deflector extending outwardly, as a lateral extension with respect to the wall, from said bottom edge of the deflector and in divergent form from the front edge of the deflector, the outer portion of the lateral extension merging in gradual curves with said front edge of the deflector, said lateral extension projecting yieldably and flexibly from the front securing means, the upper edge of the deflector being inclined downwardly and rearwardly from approximately the top of the front edge of the deflector toward the rear end of the lateral extension of the deflector.

9. In a means of the class described, the combination with a vehicle side wall member having an opening, an air deflector of transparent material having substantially in all vertical planes a straight front edge and in a horizontal plane a straight bottom edge, and means for securing these edges to the wall member at the wall opening, said deflector extending outwardly from the outside face of said side wall member, as a lateral extension with respect to the wall, from said bottom edge of the deflector and in divergent form from the front edge of the deflector, the outer portion of the lateral extension merging in gradual curves with said straight front edge of the deflector forming a portion extending outwardly from the outer face of the wall and over a portion of the opening, the deflector being composed of light-filtering material to reduce the transmission of bright sun rays.

References Cited in the file of this patent

UNITED STATES PATENTS

| Number | Name | Date |
|---|---|---|
| 483,382 | Jones | Sept. 27, 1892 |
| 824,261 | Payne | June 26, 1906 |
| 1,644,662 | Anderson | Oct. 11, 1927 |
| 2,002,730 | Crowell | May 28, 1935 |
| 2,028,827 | Cox | Jan. 28, 1936 |
| 2,039,212 | Callahan | Apr. 28, 1936 |
| 2,051,365 | Callahan | Aug. 18, 1936 |
| 2,084,385 | Conley et al. | June 22, 1937 |
| 2,106,418 | Wagner | Jan. 25, 1938 |
| 2,152,538 | Dalton | Mar. 28, 1939 |
| 2,182,107 | Anderson | Dec. 5, 1939 |
| 2,203,934 | Wiles | June 11, 1940 |
| 2,242,606 | Duncan | May 20, 1941 |
| 2,281,840 | Hamilton | May 5, 1942 |
| 2,286,584 | Simcox | June 16, 1942 |
| 2,468,439 | Gregorius | Apr. 26, 1949 |
| 2,477,888 | Milne | Aug. 2, 1949 |